United States Patent Office 3,585,256
Patented June 15, 1971

3,585,256
DYEABLE POLYOLEFIN- OR POLYESTER-COMPOSITION CONTAINING AN IMIDE INTERPOLYMER
Ronald W. Fuest, Wayne, N.J., assignor to Uniroyal, Inc., New York, N.Y.
No Drawing. Filed Oct. 25, 1968, Ser. No. 770,836
Int. Cl. C08f 29/12; C08g 39/10, 51/58
U.S. Cl. 260—873                               15 Claims

ABSTRACT OF THE DISCLOSURE

The present invention relates to shaped articles made from fiber-forming poly (alpha-olefins) or polyesters to which is added between about 0.5% and 10% of an interpolymer of maleic anhydride imide an alkylvinyl ether and optionally an aryl substituted vinyl compound. Such products are dyeable with anionic dyestuffs.

---

The present invention relates to shaped articles made from fiber forming poly(alpha-olefins) or polyesters in physical admixture with an interpolymer of maleic anhydride imide having a tertiary alkylamino group pendant therefrom, an alkylvinyl ether and optionally styrene or substituted styrene. Such nitrogen containing additive polymers may be represented by the following formula:

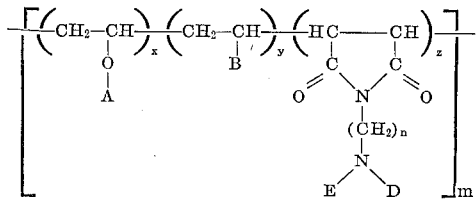

wherein:

A is an alkyl ($C_1$ to $C_{16}$) group
B is an aryl group selected from phenyl, tolyl, xylyl, naphthyl
D and E each are lower-alkyl groups ($C_1$ to $C_5$) or compositely represent an alicyclic ring of 5 carbon atoms
$x$ is about 0.1 to 1
$y$ is 0 to about 0.9; $z=1$ (in all instances $x+y=z$)
$n=2-6$
$m=8-300$ Unless otherwise indicated, the term "interpolymer" used herein shall include both the copolymer and terpolymer described above.

As is known in the prior art poly(alpha-olefins) and polyesters are essentially undyeable with anionic (i.e. acid-type dyes) due to the lack of functional groups, known as dye receptors, to which dye molecules may become attached. Processes for overcoming this defect have long been sought because good dyeability is a prerequisite to many commercial applications to which these polymers would be outstandingly suited. Recently it has been found that dyeable poly(alpha-olefin) fibers and polyester fibers can be produced by incorporating a relatively small amount (3 to 10%) of a polymeric material containing basic nitrogen atoms into such polymers prior to spinning followed by a treatment with acidic reagents, for example, hydrochloric or acetic acids.

Another method for rendering poly(alpha-olefins) and polyester dyeable with acid-type dyes involves incorporating a hydrophilic polymer such as polyethylene glycol into a mixture of a major portion of a poly(alpha-olefin) or polyester and a minor amount of a basic nitrogen-containing polymer. Such three component blends can be formed subsequently into articles which are dyeable with acid-type dyes without an acid treatment prior to dyeing.

The product of the present invention is a modified poly(alpha-olefin) or polyester composition which is dyeable with acid-type dyes without the necessity of separate treating steps and without degrading the useful properties of the resultant product.

The problem of modifying poly(alpha-olefin) or polyester materials to render them dyeable with acid-type dyes, was to perfect a basic nitrogen-containing modifying material which would provide the proper balance of hydrophobic and hydrophilic properties when blended with an olefin polymer or polyester. Such basic nitrogen-containing materials must have hydrophobic properties such that when it is blended into the poly(alpha-olefin) or polyester matrix, it is compatible (i.e. dispersible in the poly-(alpha-olefin) or polyester) and in addition is not extractable, (i.e. does not leach out) when contacted with the acid present in an acidic dye bath. On the other hand the nitrogen-containing material must be also hydrophilic, that is, it must possess sufficiently basic or polar properties so as to act as an efficient dye receptor for acid-type dyes. It has been determined that the copolymer of a polar alkylvinyl ether with dialkylaminoalkyl maleimide, or an interpolymer of said monomers and styrene or substituted styrene or other aryl compounds results in an interpolymer which possesses the proper balance of hydrophobic and hydrophilic properties when blended into a poly(alpha-olefin) or polyester matrix so that an aqueous anionic dye solution can penetrate into such poly(alpha-olefin) or polyester matrix containing the aforesaid interpolymer, wherein the dye is fixed to the basic nitrogen sites. In addition the interpolymers of this invention are not hydrophilic to the extent that they leach out of the matrix polymer during the dyeing operation.

The term poly(alpha-olefin) or polyester used herein refers to the matrix material of which the shaped article or fiber is largely composed. The preferred material in the case of the poly(alpha-olefin) of the present invention is polypropylene, and further discussion will be mainly in terms of this representative poly(alpha-olefin). However the invention is equally applicable to other fiber-forming linear alpha-olefin polymers, such as polyethylene, poly(1-butene), poly(4-methyl-1-pentene), copolymers of two or more 1-alkenes, copolymers of non-terminal olefins with 1-alkenes, etc. Physically the polyolefin may take the form of filaments, yarns, fabrics, films and sheets or other shaped form presenting a high ratio of surface to volume.

The term polyester refers to linear, fiber-forming polyesters. These polyesters include condensation polymers of dihydric alcohols with organo-dibasic acids, particularly dicarboxylic acids, and self-condensation polymers of omega-hydroxy carboxylic acids. It should be understood that the invention is applicable to all film- and fiber-forming polyesters, in which the ester linkages are intralinear, including poly(alkylene alkanedioates), poly(cycloalkylene-dimethylene alkanedioates), poly(alkylene arenedioates), poly(cycloalkylenedimethylene arenedioates), and analogous materials. Examples of some of the above-named types of polyesters are poly(ethylene adipate), poly(1,4-cyclohexylenedimethylene adipate), poly(ethylene terephthalate), poly(ethylene isophthalate, poly(co-ethylene terephthalate-isophthalate) and poly(1,4-cyclohexylenedimethylene terephthalate). Physically, the polyester may take the form of fiaments, yarns, fabrics, tapes, fibrillatd tapes, and films, or other shaped or molded forms presenting high ratio of surface to volume.

The amount of additive interpolymer described herein to be added to the poly(alpha-olefin) or polyester matrix is between about 0.5 and 10% based upon the weight of the matrix and preferably between about 4% and 6% in the case of the copolymer and between about 2% and 4% in the case of the terpolymer.

The additive interpolymer is a thermoplastic linear polymer and should have an intrinsic viscosity greater than 0.1 as measured in dimethylformamide at 30° C. when used in accordance with the present invention. With respect to the copolymer, the ratio of ether-oxygen containing monomer to nitrogen-containing monomer is 1 to 1. The ratio of monomers in the terpolymer is from 0.9 to 0.1 unit of ether oxygen-containing monomer, 0.1 to 0.9 unit of styrene or alkyl-substituted styrene monomer per 1 unit of nitrogen-containing monomer. The sum of the ratio of the ether-oxygen and styrene or substituted styrene in the interpolymer shall equal 1. The preferred monomer ratio for the terpolymer is 0.1 ether oxygen-containing monomer to 0.9 styrene to 1 nitrogen-containing monomer. The results obtained by using the copolymer or terpolymer in the poly(alpha-olefin) or polyester matrix are surprisingly unexpected because when a homopolymer containing alkylvinyl ether groups is blended with a styrene-dimethylaminoalkyl maleimide polymer and both are further blended into a poly(alpha-olefin) or polyester matrix, said blend is essentially undyeable except for some staining with acid-type dyes as compared with the blend of a poly(alpha-olefin) or polyester and the copolymer disclosed herein.

Although the copolymer and terpolymer mentioned above are equally useable as dye receptors for disperse, neutral premetallized, acid premetallized and straight acid dyes, the terpolymers are preferred, particularly since the added termonomer, e.g., styrene or substituted styrene, serves a two-fold purpose: (1) it improves the compatibility of the polymer in the poly(alpha-olefin) and polyester and (2) it suppresses undesirable color formation in the product.

The additive interpolymer having the formula described previously is made using a standard solution polymerization method. The reaction may conveniently be carried out by adding any of the aforementioned alkylvinylethers, maleic anhydride and aryl compounds in the proportions listed in the presence of such free radical catalysts as organic peroxides or hydroperoxides, etc. to form a solution in a suitable solvent having a boiling point greater than about 125° C. In this respect it should be noted that the choice of solvent is governed by three factors: (1) The initial reactants and final product should be soluble in said solvent; (2) the solvent should not be the type that has a high degree of reactivity and thus will enter into the polymerization reaction; and (3) the boiling point should be greater than 125° C. as indicated so that the imidization reaction and concomitant loss of water shall occur. Preferred free radical catalysts are azobisisobutyronitrile or benzoyl peroxide. The aforesaid mixture is allowed to react for a suitable period of time whereupon a diamine, such as dimethylaminopropylamine, is added to the resulting slurry. The slurry is refluxed for a suitable period of time (i.e. about 3 hours) to eliminate water, and the resulting solution is cooled, if desired, and poured while stirring into a low boiling (60–100° C.) aliphatic hydrocarbon solvent whereupon the polymer product precipitates as a crumb. The preparation of the nitrogen-containing additive interpolymers is more specifically illustrated in the examples.

The method used to form the blend is not critical provided the interpolymer of the present invention is homogeneously dispersed throughout the poly(alpha-olefin) or polyester. Incomplete mixing results in the formation of aggregates which impair the physical properties of the blend. The blend may be formed by mixing the two polymers in granular or powder form in a mixing apparatus followed by extrusion.

In general, when forming the mixture by extrusion, the two polymers, in granular or powder form, are first mixed by tumbling. A fine powder is preferred as this increases the degree of homogeneity. The mixture of polymers is fed to the hopper of an extruder and passed through the die at a temperature ranging between 450 and 550° F. In order to insure complete dispersion, it is desirable to pelletize the extruded strand in a strand chopper and re-extrude to form the desired product under the same extrusion conditions.

EXAMPLE I

To 100 ml. benzene were added 26.0 grams (0.25 mole) styrene, 14.5 grams (0.25 mole) methylvinylether, 49.0 grams (0.50 mole) maleic anhydride and 0.70 gram azobisisobutyronitrile, the latter material acting as the initiator for the reaction. The above mixture was agitated and allowed to react at 70° C. for a period of 18 hours. The solid product resulting from the reaction was isolated, dried and suspended in 500 ml. xylene. To this suspension was added 52 grams (0.5 mole) dimethylaminopropylamine and the mixture was heated to reflux for 3 hours with continuous removal of water during which time the solid polymer went into solution. The product was precipitated by pouring the reaction mixture into 3 liters of Skelly-solve B with stirring. The fine crumb was washed a second time in Skellysolve B, followed by drying in vacuo at 55° C. for 18 hours.

The analysis was as follows.—Theory (percent): N, 10.6; styrene, 19.8. Found (percent): N, 10.9; styrene, 20.9.

EXAMPLE II

Sixteen grams of the terpolymer prepared in Example I was then mixed with 400 grams of fiber grade polypropylene, (Profax 6623—produced by Hercules and containing heat stabilizers) and extruded in rod form to thoroughly disperse the terpolymer uniformly in the polypropylene resin. After the extruded rod was sliced into small pellets the pellets were then extruded at 550° F. into an 8 filament yarn using a conventional melt spinning apparatus. The resulting yarn was drawn 4:1 at 275° F. to yield a drawn yarn at 15.8 denier/filament. Its tenacity was 3.75 grams/denier and its elongation at the break 55%. Skeins of this yarn could be dyed to deep colors, using conventional dyeing processes, with 3% o.w.f. (on the weight of the fiber) concentration of the following dyes:

Capracyl Orange R Acid Orange 60 [the half chrome complex of 1-phenyl-3-methoyl-4-(2-hydroxy-5-sulfamyl phenylazo)-5-pyrazolone].

Acid Yellow 121 (C.I. No. 18690)

Croceine Scarlet SS Acid Red 73 (C.I. No. 27290)

Anthraquinone Blue Sky Acid Blue 78 (C.I. No. 62105)

Cibacete Orange 2RN Disperse Orange 3 (C.I. No. 11005)

A similar yarn, spun without the terpolymer yielded almost colorless dyeings when dyed with the same dyes under the same conditions.

EXAMPLE III

This example is similar to the preparation described in Example I except in this case the monomer ratio of the terpolymer of styrene, methylvinylether and dimethylaminopropylmaleimide was 4:1:5 instead of a monomer ratio of 2.5:2.5:5. The procedure for carrying out the reaction was the same as described in Example I.

EXAMPLE IV

Eight grams of the terpolymer prepared in Example III was then mixed with 400 grams of fiber grade polypropylene (Profax 6623 produced by Hercules and containing standard heat stabilizers) and extruded into an 8 filament yarn according to the procedures described in Example II.

Again, skeins of yarn could be dyed to deep colors, using conventional dyeing procedures, with 3% o.w.f. concentration of the following dyes:

Capracyl Orange R Acid Orange [the half chrome complex of 1-phenyl-3-methyl-4-(2-hydroxy-5-sulfamoyl phenylazo)-5-pyrazolone].
Acid Yellow 121 (C.I. No. 18690)
Croceine Scarlet SS Acid Red 73 (C.I. No. 27290)
Cibacete Orange 2RN Disperse Orange 3 (C.I. No. 11005)

EXAMPLE V

This example describes the preparation of the terpolymer of styrene, isopropylvinylether and dimethylaminopropylmaleimide.

To 2 liters of xylene was added 98.0 grams (1.0 mole) maleic anhydride, 52.0 grams (0.5 mole) styrene, 44.0 grams isopropylvinylether and 1.49 grams azobisisobutyronitrile as the initiator for the reaction. The mixture was heated for 4 hours at 70° C. in an argon atmosphere and then allowed to cool to room temperature. The milky suspension thus formed was drawn off and placed in a flask to which was added 112 grams (1.44 mole) dimethylaminopropylamine. The mixture was then refluxed for 2 hours with continuous removal of water. The product was precipitated by the pouring of the solution into 3 liters Skellysolve B, filtered and dried in vacuo for 18 hours at 50° C.

The analysis was as follows.—Theory (percent): N, 10.1; styrene, 16.7. Found (percent): N, 10.1; styrene, 16.6.

EXAMPLE VI

Twelve grams of the terpolymer prepared in Example V was then mixed with 300 grams of fiber grade polypropylene and spun into fiber according to the procedure described in Example II.

Again skeins of yarn could be dyed to deep colors using conventional dyeing procedures with 3% o.w.f. concentration of the following dyes:

Capracyl Orange R Acid Orange 60 [the half chrome complex of 1-phenyl-3-methyl-4-(2-hydroxy-5-sulfamoyl phenylazo)-5-pyrazolone].
Acid Yellow 121 (C.I. No. 18690)
Croceine Scarlet SS Acid Red 73 (C.I. No. 27290)

EXAMPLE VII

This example demonstrates the preparation of a (1:1) copolymer of methylvinylether and dimethylaminoethyl maleimide.

To 200 ml. xylene was added 20 grams (0.13 mole) methyl-vinylether-maleic anhydride copolymer and 17.0 grams (0.19 mole) dimethylaminoethylamine. The mixture was refluxed for two hours with continuous removal of water during which time the mixture became deep blue in color. The solution was then transferred and reprecipitated in 1.5 liters of Skellysolve B and a dark blue solid was isolated.

The analysis was as follows.—Theory (percent): N, 10.55. Found (percent): N, 10.13.

EXAMPLE VIII

Twelve grams of the copolymer prepared in Example VII was then mixed with 300 grams of polypropylene and again extruded into an 8 filament yarn according to the procedure described in Example II.

Again, skeins of yarn could be dyed to deep colors, using conventional dyeing procedures, with 3% o.w.f. concentration of the following dyes:

Capracyl Orange R Acid Orange 60 [the half chrome complex of 1-phenyl-3-methyl-4-(2-hydroxy-5-sulfamoyl phenylazo)-5-pyrazolone].
Croceine Scarlet SS Acid Red 73 (C.I. No. 27290)
Anthraquinone Blue Sky Acid Blue 78 (C.I. No. 62105)

EXAMPLE IX

Eight grams of the terpolymer prepared in Example I was mixed with 400 grams of dried, fiber grade poly(ethylene terephthalate) pellets. The blend was then extruded at 540° F. into an eight filament yarn using conventional melt-spinning apparatus. Skeins of the yarn when dyed by the same conventional procedure used in Example II were found to be dyeable with 3% o.w.f. concentration of the following dyes:

Capracyl Orange R Acid Orange 60 [the half-chrome complex of 1-phenyl-3-methyl-4-(2-hydroxy-5-sulfamoyl phenylazo)-5-pyrazolone].
Acid Yellow 121 (C.I. No. 18690)
Croceine Scarlet SS Acid Red 73 (C.I. No. 27290)
Anthraquinone Blue Sky Acid Blue 78 (C.I. No. 62105)
Cibacete Orange 2RN Disperse Orange 3 (C.I. No. 11005)

A similar yarn, spun without the terpolymer yielded almost colorless dyeings when dyed with the same dyes under identical conditions.

EXAMPLE X

This example describes the preparation of the terpolymer of styrene, cetylvinylether and 3-piperidinopropyl malemide. To 2 liters of xylene is added 49 grams (0.5 mole) of maleic anhydride, 36.5 grams (0.35 mole) styrene and 40.4 grams (0.15 mole) of cetylvinylether and 0.70 gram of azobisisobutyronitrile as initiator for the polymerization reaction. The mixture is heated for four hours at 70° C. in an argon atmosphere and then allowed to cool at room temperature. The milky suspension thus formed is drawn off and placed in a flask to which is added 85.2 grams (0.6 mole) of N-(3-aminopropyl) piperidine. This mixture is refluxed for 2 hours with continuous removal of water. The product is precipitated by pouring the solution into three liters of Skellysolve B (an aliphatic hydrocarbon similar to heptane having a boiling range between about 90 and 98° C.) filtered and dried in vacuo for 18 hours at 50° C.

EXAMPLE XI

Twelve grams of the terpolymer prepared in Example X are mixed with 400 grams of fiber forming polypropylene and the blend is extruded into an 8 filament yarn using the procedure described in Example II. Skeins of such yarn are dyeable to deep colors using conventional anionic dyeing procedures with 3% o.w.f. (on the weight of the fiber) concentration of the following dyes:

Capracyl Orange R (Acid Orange 60)
Brilliant Alizarine Milling Blue (Acid Blue 26)
Anthraquinone Blue Sky (Acid Blue 78)

EXAMPLE XII

This example described the preparation of the terpolymer of styrene, with isoctylvinylether and N,N-dibutylaminopropylmaleimide.

To 2 liters of xylene is added 49 grams (0.5 mole) of maleic anhydride, 26 grams (0.25 mole) styrene and 39.3 grams (0.25 mole) of isoctylvinylether and 0.70 gram of azobisisobutyronitrile as initiator for the polymerization reaction. The mixture is heated for four hours at 70° C. in an argon atmosphere and then allowed to cool to room temperature. The milky suspension thus formed is drawn off and placed in a flask to which is added 102 grams (0.55 mole) of N,N-dibutyl-1,3-propanediamine. This mixture is refluxed for two hours with continuous removal of water. The product is precipitated by pouring said solution into three liters of Skellysolve B, filtered and dried in vacuo for 18 hours.

EXAMPLE XIII

Twelve grams of the terpolymer prepared in Example XII are mixed with 400 grams of fiber-forming polypropylene and the blend is extruded into an 8-filament yarn using the procedure described in Example II.

Skeins of said yarns are dyed to deep colors using conventional dyeing procedures with 3% o.w.f. concentration of the dyes used in Example XI.

What I claim and desire to protect by Letters Patent is:

1. A thermoplastic composition which is readily dyeable with acid type dyes consisting essentially of a blend of a fiber-forming poly (alpha-olefin) or a fiber-forming polyester which is a condensation polymer of a dihydric alcohol and a dicarboxylic acid, and between about 0.5% and 10% based upon the weight of said poly (alpha-olefin) or polyester of a thermoplastic nitrogen-containing interpolymer having the formula:

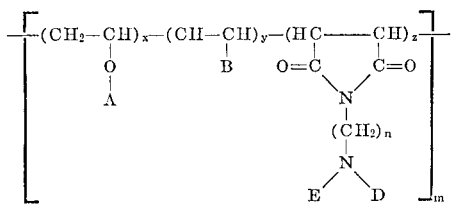

wherein:
A is an alkyl group having 1 to 16 carbon atoms
B is an aryl group selected from phenyl, tolyl, xylyl, or naphthyl,
D and E are each lower alkyl groups having 1 to 4 carbon atoms, or compositely represent an alicyclic ring having 5 carbon atoms,
$x$ is about 0.1 to 1
$y$ is 0 to about 0.9
and $x+y=z$
$z$ is 1
$n$ is 2 to 6
and $m$ is 8 to 300.

2. The composition defined in claim 1 in which the polyolefin is selected from the group consisting of polyethylene, polypropylene, poly(1-butene) and poly(4-methyl-1-pentene) and the polyester is selected from poly (ethylene terephthalate), poly(ethylene isophthalate), poly(co-ethylene isophthalate-terephthalate) and poly(1,4-cyclohexylene dimethylene terephthalate).

3. The composition defined in claim 2 having the nitrogen-containing interpolymer wherein:
A is an alkyl group having 1 to 3 carbon atoms,
B is phenyl,
D and E are alkyl groups each having 1 to 2 carbon atoms,
$n$ is 3,
$x$ is 0.1 to 0.5 and $y$ is corespondingly 0.9 to 0.5,
$z=1$.

4. The composition defined in claim 2 in which the polyolefin is polypropylene and is blended with said nitrogen-containing interpolymer wherein:
A is methyl
B is phenyl
D and E are both methyl
$n$ is 3
$x$ is 0.5, $y$ is 0.5 and $z$ is 1.

5. The composition defined in claim 2 in which the polyolefin is polypropylene and is blended with said nitrogen-containing interpolymer wherein:
A is methyl
B is phenyl
D and E are each methyl
$n$ is 3
$x$ is 0.8, $y$ is 0.2 and $z$ is 1.

6. The composition defined in claim 2 in which the polyolefin is polypropylene and is blended with said nitrogen-containing interpolymer wherein:
A is an alkyl group having 3 carbon atoms
B is phenyl
D and E are each methyl
$n$ is 3
$x$ is 0.5, $y$ is 0.5 and $z$ is 1.

7. The composition defined in claim 2 in which the polyolefin is polypropylene and is blended with said nitrogen-containing interpolymer wherein:
A is methyl
D and E are each methyl
$n$ is 3
$x$ is 1, $y$ is 0, $z$ is 1.

8. The composition defined in claim 2 in which the polyolefin is polypropylene, and is blended with said nitrogen-containing interpolymer wherein:
A is an alkyl group having 16 carbon atoms
B is phenyl
D and E compositely represent
—CH$_2$—(CH$_2$)$_3$—CH$_2$—
$n$ is 3
$x$ is 0.3, $y$ is 0.7 and $z$ is 1.

9. The composition defined in claim 2 in which the polyolefin is polypropylene and is blended with said nitrogen-containing interpolymer wherein:
A is an alkyl group having 8 carbon atoms
B is phenyl
D and E are each alkyl groups having 4 carbon atoms
$n$ is 3
$x$ is 0.5, $y$ is 0.5 and $z$ is 1.

10. The composition defined in claim 2 in which the polyester is poly(ethylene terephthalate) blended with said nitrogen-containing interpolymer wherein:
A is methyl
B is phenyl
D and E are both methyl
$n$ is 3
$x$ is 0.5, $y$ is 0.5 and $z$ is 1.

11. The composition defined in claim 2 in which the polyester is poly(ethylene terephthalate) and is blended with said nitrogen-containing interpolymer wherein:
A is methyl
B is phenyl
D and E are each methyl
$n$ is 3
$x$ is 0.8, $y$ is 0.2 and $z$ is 1.

12. The composition defined in claim 2 in which the polyester is poly(ethylene terephthalate) and is blended with said nitrogen-containing interpolymer wherein:
A is an alkyl group having 3 carbon atoms
B is phenyl
D and E are each methyl
$n$ is 3
$x$ is 0.5, $y$ is 0.5 and $z$ is 1.

13. The composition defined in claim 2 in which the polyester is poly(ethylene terephthalate) and is blended with said nitrogen-containing interpolymer wherein:
A is methyl
D and E are each methyl
$n$ is 3
$x$ is 1, $y$ is 0, $z$ is 1.

14. The composition defined in claim 2 in which the polyester is poly(ethylene terephthalate) and is blended with said nitrogen-containing interpolymer wherein:
A is an alkyl group having 16 carbon atoms
B is phenyl
D and E compositely represent
—CH$_2$—(CH$_2$)$_3$—CH$_2$—
$n$ is 3
$x$ is 0.3, $y$ is 0.7 and $z$ is 1.

15. The composition defined in claim 2 in which the polyester is poly(ethylene terephthalate) and is blended with said nitrogen-containing interpolymer wherein:
  A is an alkyl group having 8 carbon atoms
  B is phenyl
  D and E are each alkyl groups having 4 carbon atoms
  $n$ is 3
  $x$ is 0.5, $y$ is 0.5 and $z$ is 1.

References Cited
UNITED STATES PATENTS

| | | | |
|---|---|---|---|
| 3,265,675 | 8/1966 | Hagemeyer et al. | 260—897 |
| 3,475,518 | 10/1969 | Cantatore | 260—897 |
| 3,483,276 | 12/1969 | Mahlman | 260—897 |
| 3,505,429 | 4/1970 | Press | 260—873 |

FOREIGN PATENTS

| | | | |
|---|---|---|---|
| 1,028,887 | 5/1966 | Great Britain | 260—873 |

WILLIAM H. SHORT, Primary Examiner

E. WOODBERRY, Assistant Examiner

U.S. Cl. X.R.

260—45.8, 896, 897